(12) United States Patent
Yilma et al.

(10) Patent No.: US 10,017,099 B2
(45) Date of Patent: Jul. 10, 2018

(54) TONNEAU COVER WITH TWO SETS OF FOLDING LEGS

(71) Applicant: FORD GLOBAL TECHNOLOGIES, LLC, Dearborn, MI (US)

(72) Inventors: Benjamin Yilma, Canton, MI (US); Pattrick Loew, Dearborn, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 29 days.

(21) Appl. No.: 15/186,810

(22) Filed: Jun. 20, 2016

(65) Prior Publication Data

US 2017/0361755 A1    Dec. 21, 2017

(51) Int. Cl.
*B62D 33/02* (2006.01)
*B60P 7/02* (2006.01)
*B60P 7/08* (2006.01)

(52) U.S. Cl.
CPC ...... *B60P 7/02* (2013.01); *B60P 7/08* (2013.01); *B62D 33/02* (2013.01)

(58) Field of Classification Search
CPC ......... A47B 31/06; A47B 83/024; A47B 3/14; A47B 2003/145; B60N 3/004; B60J 7/047; B60J 7/02; B60J 7/141; B60J 7/198
USPC ...... 108/44, 45, 152; 297/135, 158.3, 158.4, 297/158.5; 296/100.03, 100.06, 100.08, 296/100.17, 100.18, 225
See application file for complete search history.

(56) References Cited

U.S. PATENT DOCUMENTS

| 4,550,945 | A | * | 11/1985 | Englehardt | B60J 7/041 160/213 |
| 4,824,163 | A | * | 4/1989 | Hendrych | B60P 7/02 108/34 |
| 4,830,242 | A | * | 5/1989 | Painter | B60P 3/32 224/404 |
| 5,239,934 | A | * | 8/1993 | Miller | B25H 1/12 108/44 |
| 6,032,590 | A | * | 3/2000 | Chen | A47B 3/06 108/158.12 |
| 6,062,146 | A | * | 5/2000 | Conners | B60R 5/045 108/44 |
| 6,109,687 | A | * | 8/2000 | Nye | A47B 3/0911 297/139 |
| 6,224,127 | B1 | | 5/2001 | Hodge | |
| 6,314,891 | B1 | * | 11/2001 | Larson | A47B 3/14 108/44 |

(Continued)

FOREIGN PATENT DOCUMENTS

CN            203391655 U     1/2014

OTHER PUBLICATIONS

English Machine Translation of CN203391655U.
(Continued)

*Primary Examiner* — Jose V Chen
(74) *Attorney, Agent, or Firm* — Jason Rogers; King & Schickli, PLLC

(57) ABSTRACT

A tonneau cover is provided. That tonneau cover includes a panel, a first set of folding legs carried on the panel and a second set of folding legs carried on the panel. The first set of folding legs have a first length $L_1$ while the second set of folding legs have a second length $L_2$ where $L_1 > L_2$. Depending upon which set of folding legs is deployed, the panel may be converted into a table or a bench as desired.

11 Claims, 14 Drawing Sheets

(56) References Cited

U.S. PATENT DOCUMENTS

| | | | |
|---|---|---|---|
| 6,533,344 B1 | 3/2003 | Patterson | |
| 6,637,349 B1* | 10/2003 | Lafferty | A47B 37/04 108/20 |
| 6,663,160 B2 | 12/2003 | Yarbrough et al. | |
| 6,905,166 B2* | 6/2005 | Zhurong | A47B 3/0912 108/132 |
| 7,159,917 B2 | 1/2007 | Haaberg | |
| 7,309,202 B1 | 12/2007 | Anderson | |
| 8,033,435 B1* | 10/2011 | Brooke | B60R 9/065 108/167 |
| 8,424,946 B2* | 4/2013 | Newberg | B60R 5/04 108/44 |
| 2005/0052058 A1* | 3/2005 | Nyo | A47B 3/0911 297/159.1 |
| 2006/0071498 A1* | 4/2006 | Taylor | B60N 2/345 296/26.09 |
| 2006/0219746 A1* | 10/2006 | Kniffel | B60R 9/00 224/404 |
| 2008/0191506 A1* | 8/2008 | Huotari | A47B 37/00 296/37.6 |
| 2013/0229027 A1* | 9/2013 | Copp | B60J 7/198 296/100.08 |
| 2016/0332679 A1* | 11/2016 | Krishnan | B60J 7/1607 |
| 2017/0210214 A1* | 7/2017 | Weltikol | B60J 7/141 |

OTHER PUBLICATIONS

Mike Ferrin; "Homemade Tonneau Cover"; https://www.youtube.com/watch?v=nbNQhfVg-5s; YouTube video published Apr. 27, 2015.

* cited by examiner

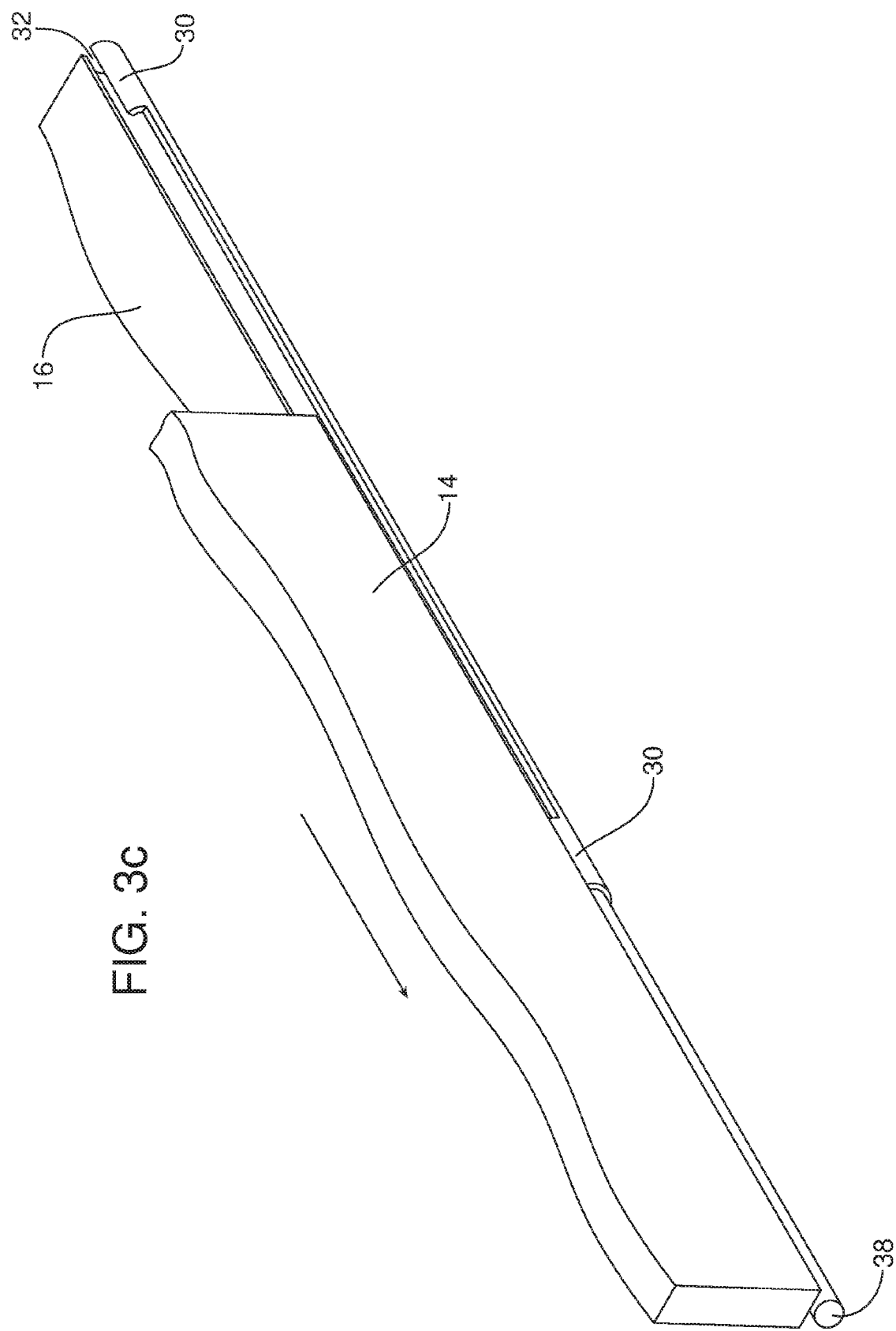

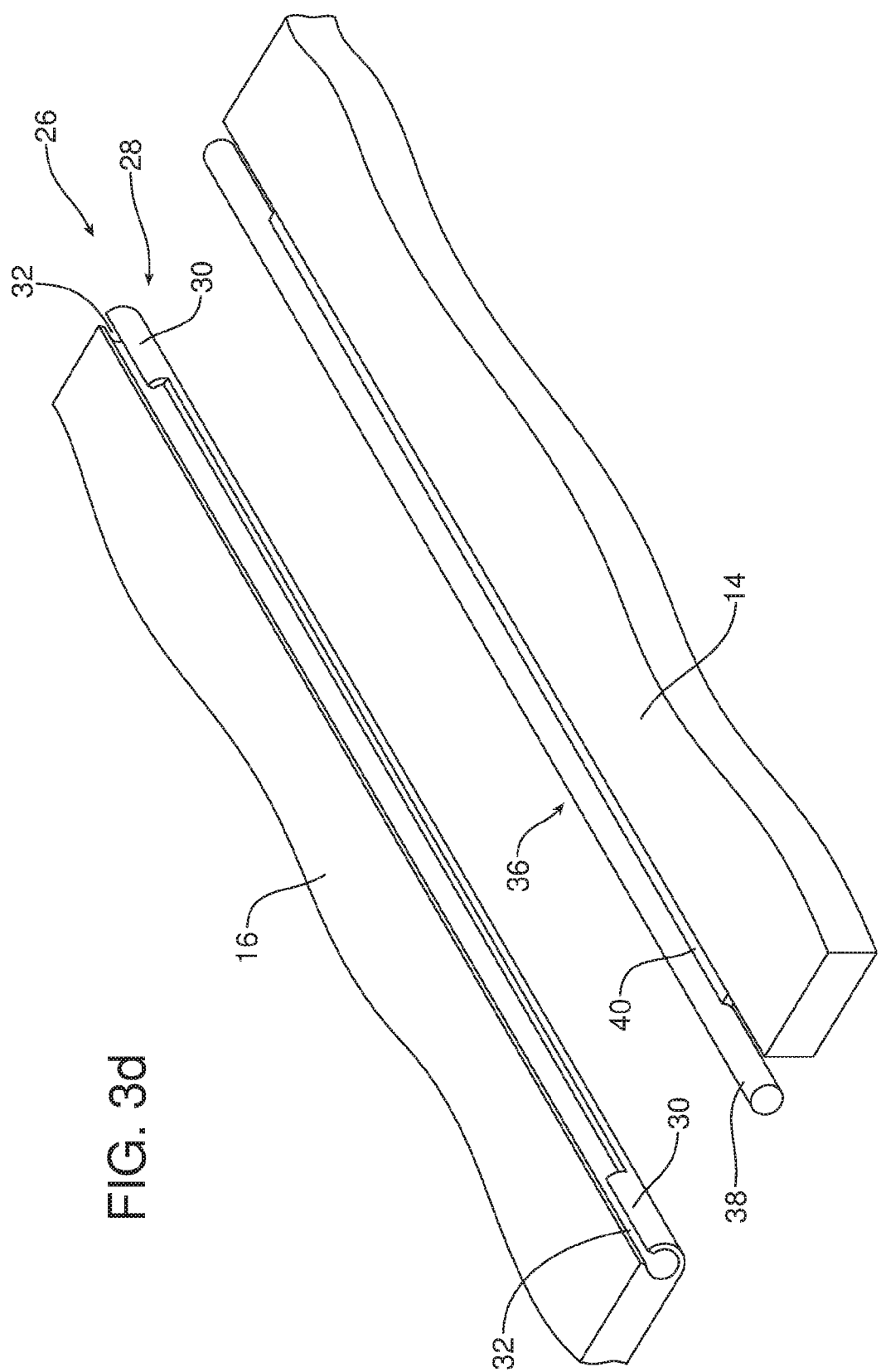

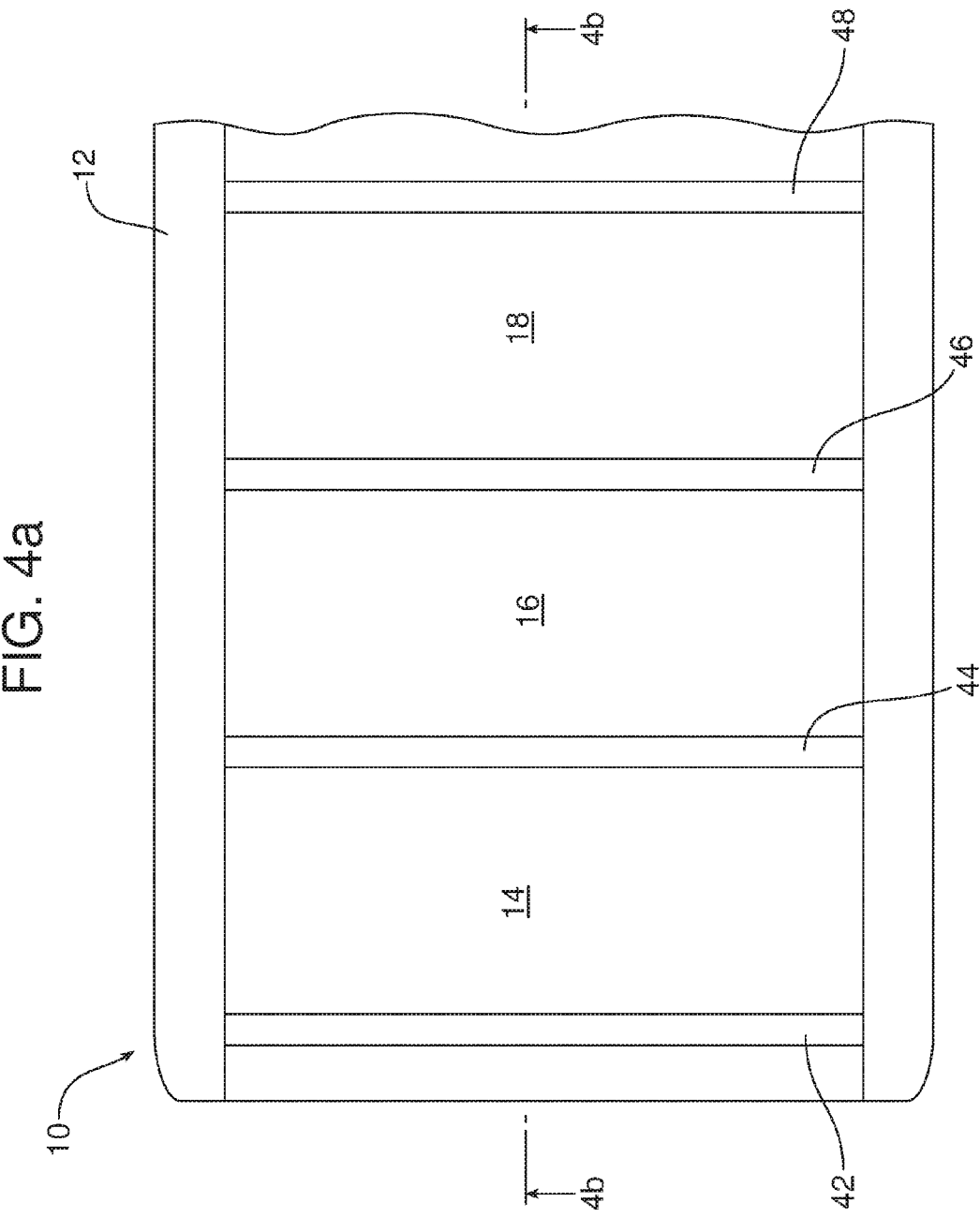

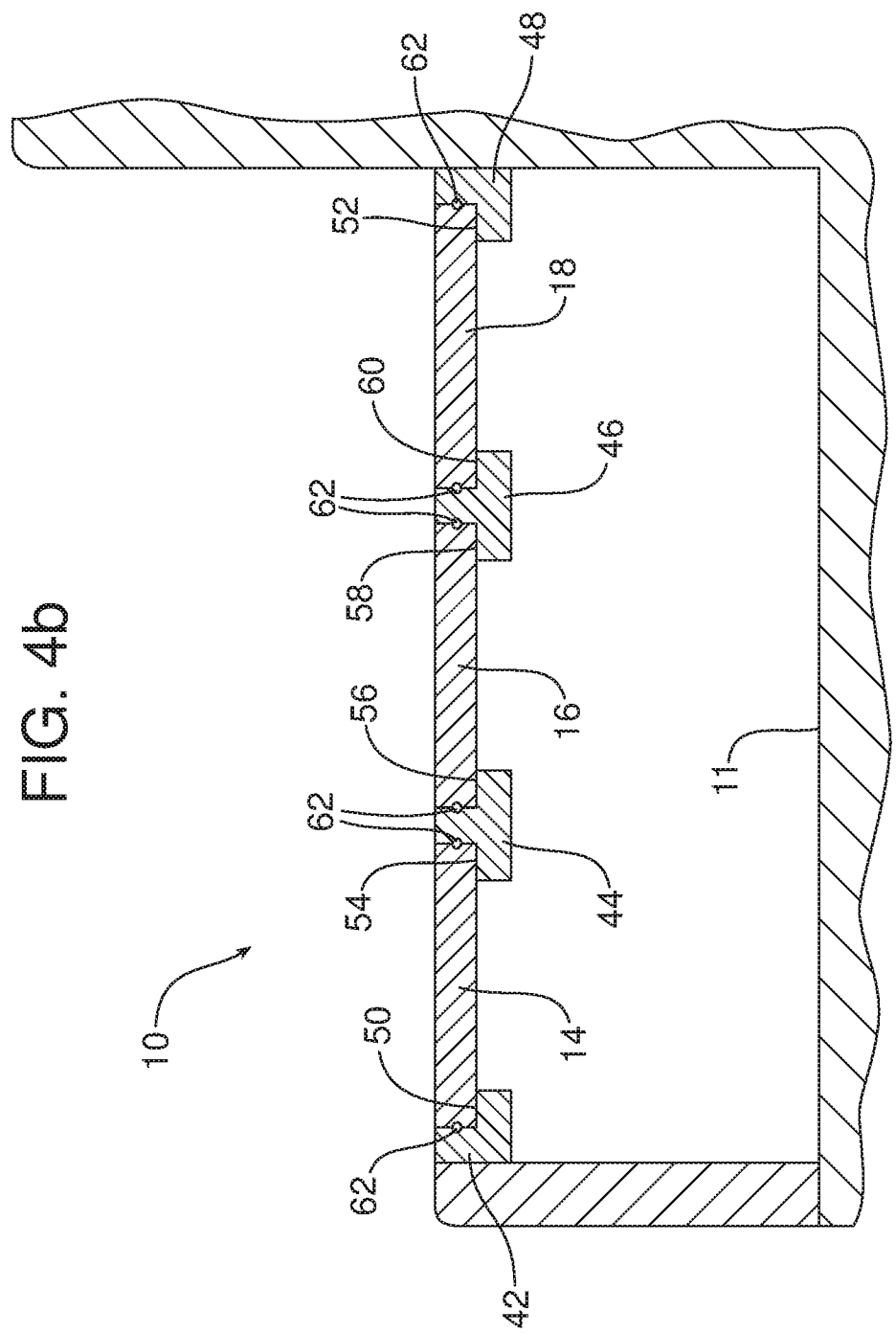

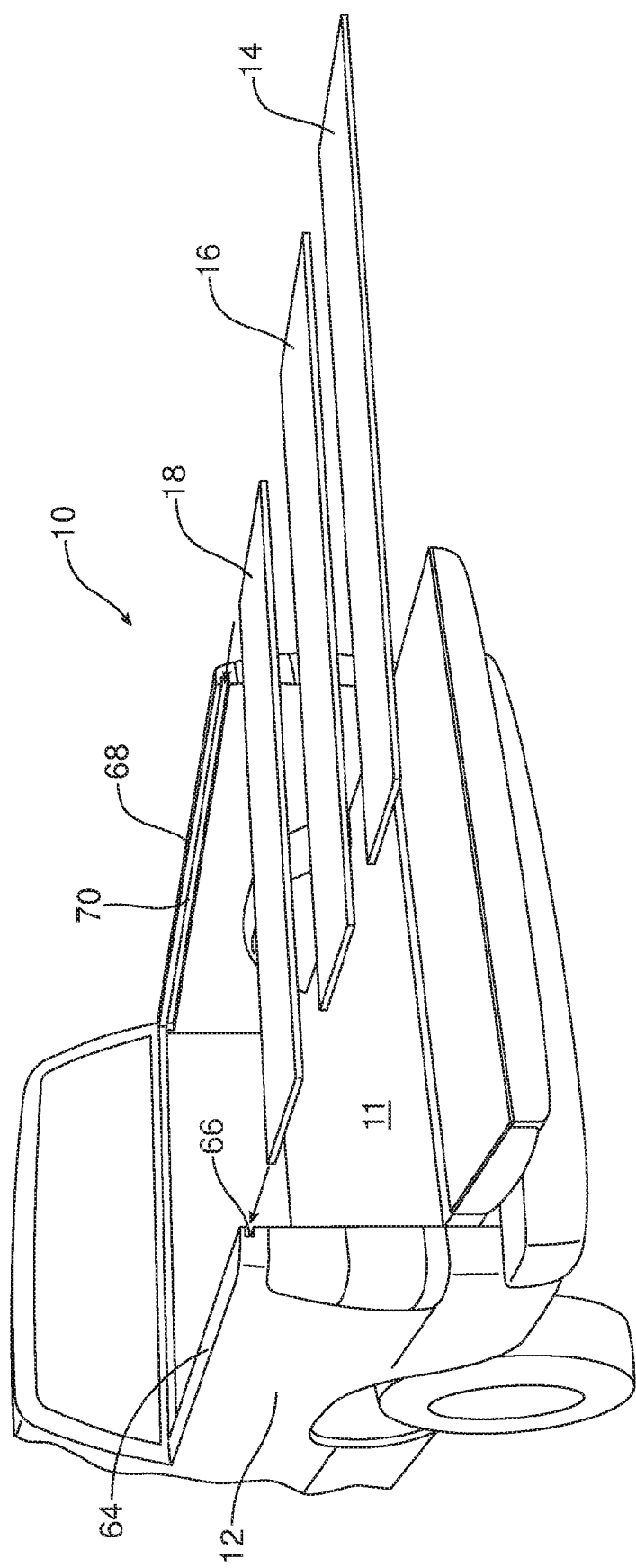

TONNEAU COVER WITH TWO SETS OF FOLDING LEGS

TECHNICAL FIELD

This document relates generally to the motor vehicle equipment field and, more particularly, to a tonneau cover for the load bed of a pickup truck that incorporates two sets of folding legs.

BACKGROUND

The load bed of a pickup truck has a limited capacity for holding tools, equipment and work supplies necessary to complete a job. Many times, sawhorses and work tables need to be brought to a job site as well because the job site does not have working surfaces. In situations where it is necessary to bring sawhorses or a work table to a job site, they consume some of the available load capacity of the truck bed thereby cutting down on the amount of other tools, equipment and work supplies that may be transported. This is a significant detriment.

This document relates to a new and improved tonneau cover for a pickup truck or like vehicle wherein one or more panels of the tonneau cover incorporate two sets of folding legs that allow the panel or panels to be erected and utilized as a work table or sawhorses. Further, it should be appreciated that a three-panel tonneau cover may be configured as a picnic table wherein one panel is configured as a table and two other panels are configured as benches for sitting at the table. Thus, the tonneau cover described herein is characterized by enhanced versatility making it useful on the job site as well as for family recreation.

SUMMARY

In accordance with the purposes and benefits described herein, a tonneau cover is provided. That tonneau cover comprises a panel, a first set of folding legs carried on the panel and a second set of folding legs carried on the panel. The first set of folding legs have a first length $L_1$ and the second set of folding legs have a second length $L_2$ where $L_1 > L_2$.

The tonneau cover may further include a second panel. That second panel may include a third set of folding legs having a length $L_3$ and a fourth set of folding legs having a length $L_4$ where $L_3 > L_4$. In one possible embodiment the length $L_3 = L_1$ and $L_4 = L_2$.

The tonneau cover may also include a third panel. That third panel may include a fifth set of folding legs having a length $L_5$ and a sixth set of folding legs having a length $L_6$ where $L_5 > L_6$. In one possible embodiment, the length $L_5$ equals the length $L_3$ and $L_1$ while the length $L_6$ equals the length $L_4$ and $L_2$.

The tonneau cover may further include a first hinge assembly connecting the panel to the second panel and a second hinge assembly connecting the second panel to the third panel. That first hinge assembly may include (a) a first section comprising a slotted wall defining a cylindrical bore and (b) a second section comprising a cylindrical body carried on a lug. When the panel and the second panel are connected together the cylindrical body is concentrically received within the slotted wall and held in the cylindrical bore. The panel may be disconnected from the second panel by aligning the lug with a slot in the slotted wall and sliding the panel and the second panel apart.

In a possible alternative embodiment, the tonneau cover includes a first support bar, a second support bar, a third support bar and a fourth support bar. These support bars span the sidewalls of the load bed. Further, the panel spans and is supported between the first support bar and the second support bar. The second panel spans and is supported between the second support bar and the third support bar. The third panel spans and is supported between the third support bar and the fourth support bar. In such an embodiment the first support bar and the fourth support bar may each include a single panel support shoulder while the second support bar and the third support bar may each include two panel support shoulders.

The tonneau cover may further include a latch mechanism securing (a) the panel to the first support bar and the second support bar, (b) the second panel to the second support bar and the third support bar and (c) the third panel to the third support bar and the fourth support bar.

In still another possible embodiment, the tonneau cover includes a first support rail and a second support rail. The panel, the second panel and the third panel all span the first support rail and the second support rail. More specifically, a first end of each of the panels is received and held in a first channel in the first support rail while a second end of each of the panels is received and held in a second channel in the second support rail.

Still further, the tonneau cover may include a locking mechanism to secure each of the first set of legs and the second set of legs in a stowed position or a deployed position.

In accordance with yet another aspect, a tonneau cover is provided comprising three panels that are configured in a cover mode to cover a load bed of a truck. Alternatively, those three panels may be configured in a picnic table mode to provide a table and two benches for sitting at the table.

In the following description, there are shown and described several preferred embodiments of the tonneau cover. As it should be realized, the tonneau cover is capable of other, different embodiments and its several details are capable of modification in various, obvious aspects all without departing from the tonneau cover as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the tonneau cover and together with the description serve to explain certain principles thereof. In the drawing figures:

FIG. 3c shows how the panels illustrated in FIGS. 3a and 3b may slide apart and be separated.

FIG. 3d shows the two panels after separation.

FIG. 4a is a top plan view of an alternative embodiment wherein the three panels of the tonneau cover are supported on four support rails so as to extend across the load bed of the pickup truck.

FIG. 4b is a cross-sectional view of the embodiment illustrated in FIG. 4a taken along line 4b-4b.

FIG. 5 is a perspective view of still another embodiment wherein the panels of the tonneau cover extend between two support rails at opposite sidewalls of the load bed.

Reference will now be made in detail to the present preferred embodiments of the tonneau cover, examples of which are illustrated in the accompanying drawing figures.

DETAILED DESCRIPTION

Figure 1:
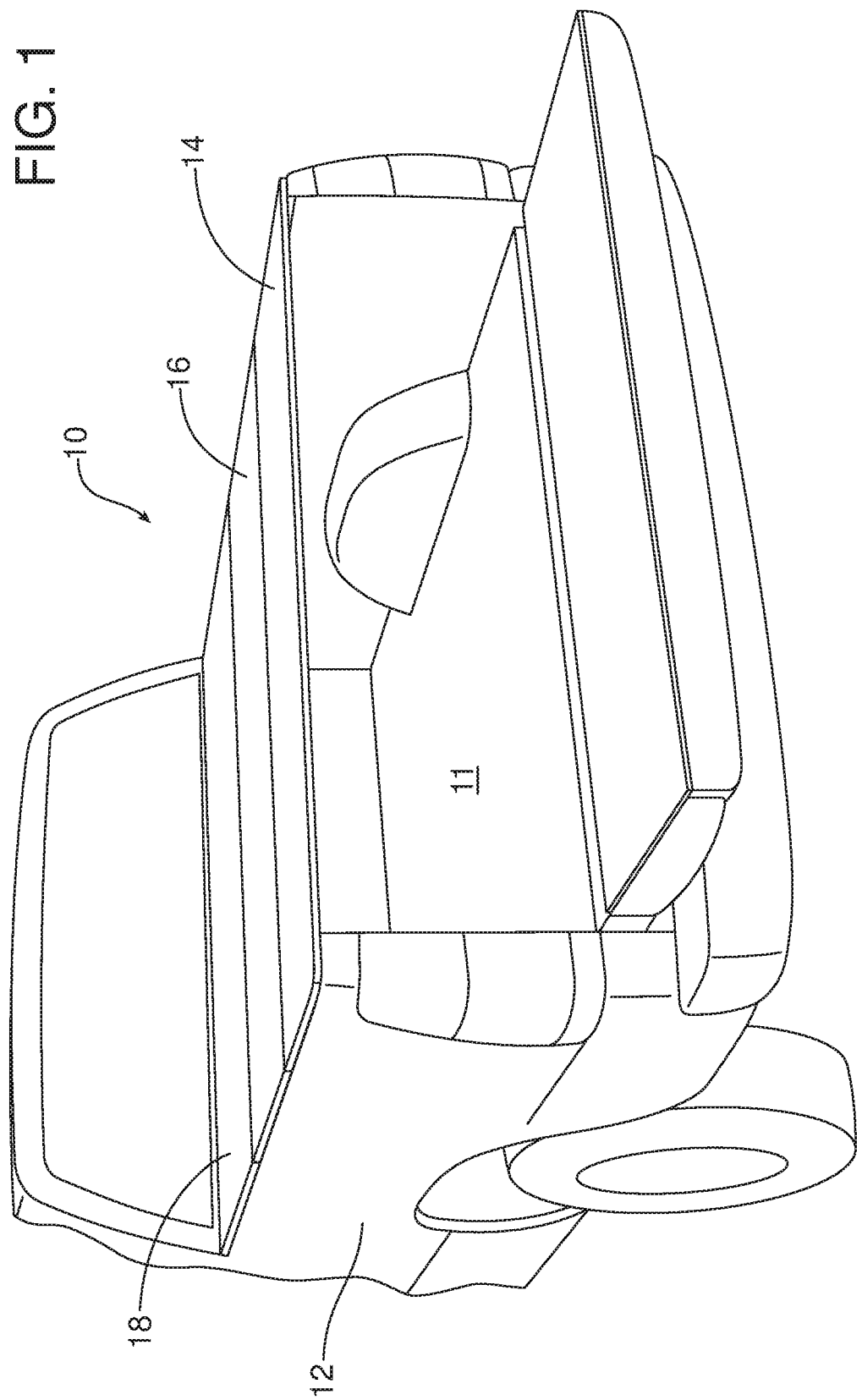
FIG. 1 is a perspective view of the tonneau cover configured in a cover mode to cover the load bed of a pickup truck.

Reference is now made to FIG. 1 illustrating the tonneau cover 10 configured in a cover mode to cover a load bed 11 of a pickup truck 12. As illustrated, the tonneau cover 10 includes a first panel 14, a second panel 16 and a third panel 18. In the cover mode illustrated in FIG. 1, the three panels 14, 16, 18 are aligned together in a horizontal position so as to span and fully cover the load bed of the pickup truck 12.

Figure 2:
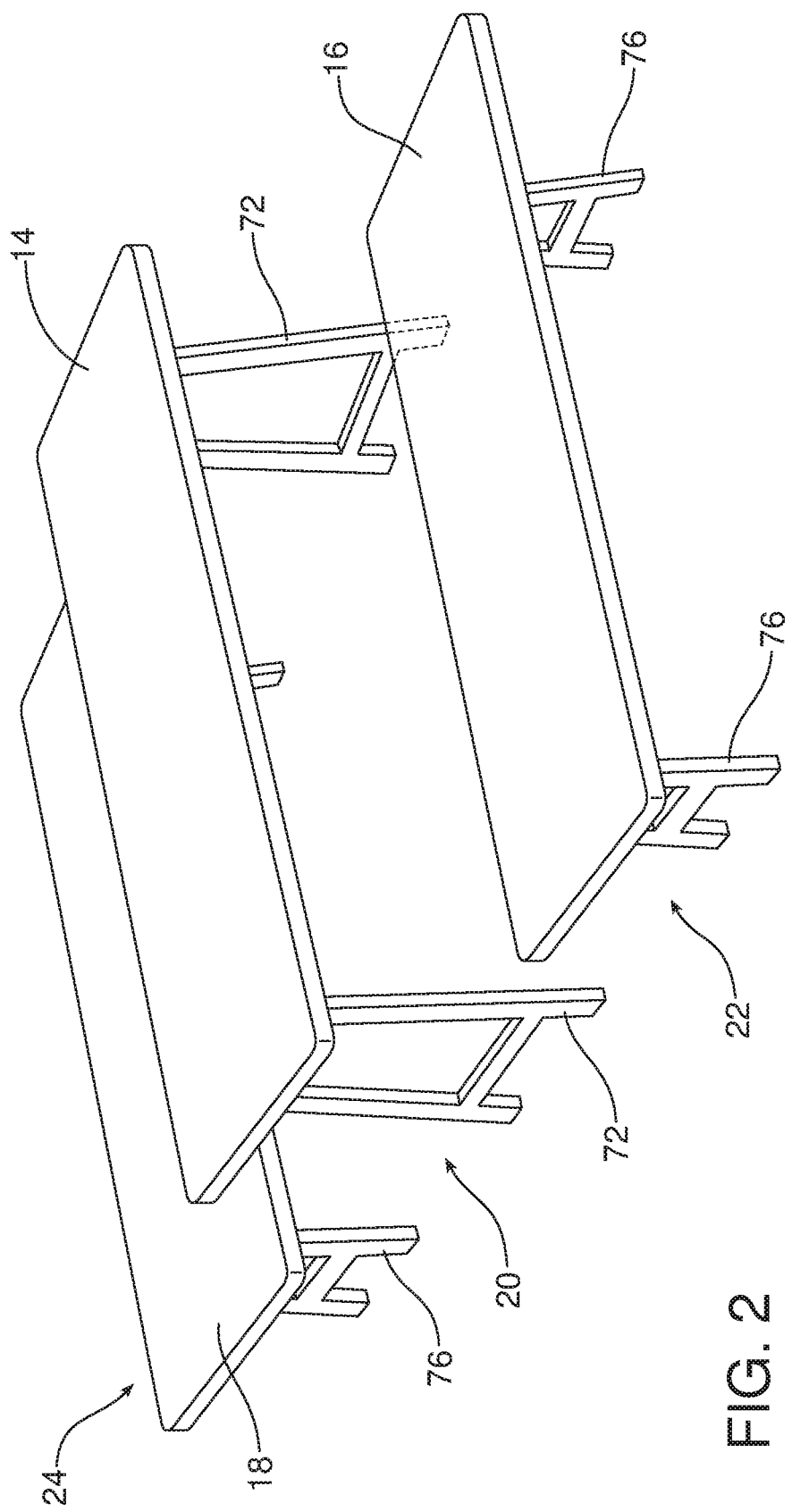
FIG. 2 is a perspective view of the tonneau cover configured in a picnic table mode to provide a table and two benches for sitting at the table.

Reference is now made to FIG. 2 which illustrates the tonneau cover 10 configured in a picnic table mode to provide a table 20, as well as a first bench 22 and a second bench 24 for sitting at the table. In the illustrated embodiment, the table 20 is made with the first panel 14, the first bench 22 is made with the second panel 16 and the second bench 24 is made with the third panel 18.

Reference is now made to FIGS. 3a-3d illustrating a first possible embodiment of the tonneau cover 10. As illustrated in these two figures, a first hinge assembly 26 connects the first panel 14 to the second panel 16. The first hinge assembly 26 includes a first section 28 comprising a slotted wall 30 incorporating a slot 32 and defining a cylindrical bore 34. The first hinge assembly 26 also includes a second section 36 comprising a cylindrical body 38 carried on the end of a lug 40. In the illustrated embodiment the first section 28 is connected to the second panel 16 while the second section 36 is connected to the panel 14.

Figure 3A:
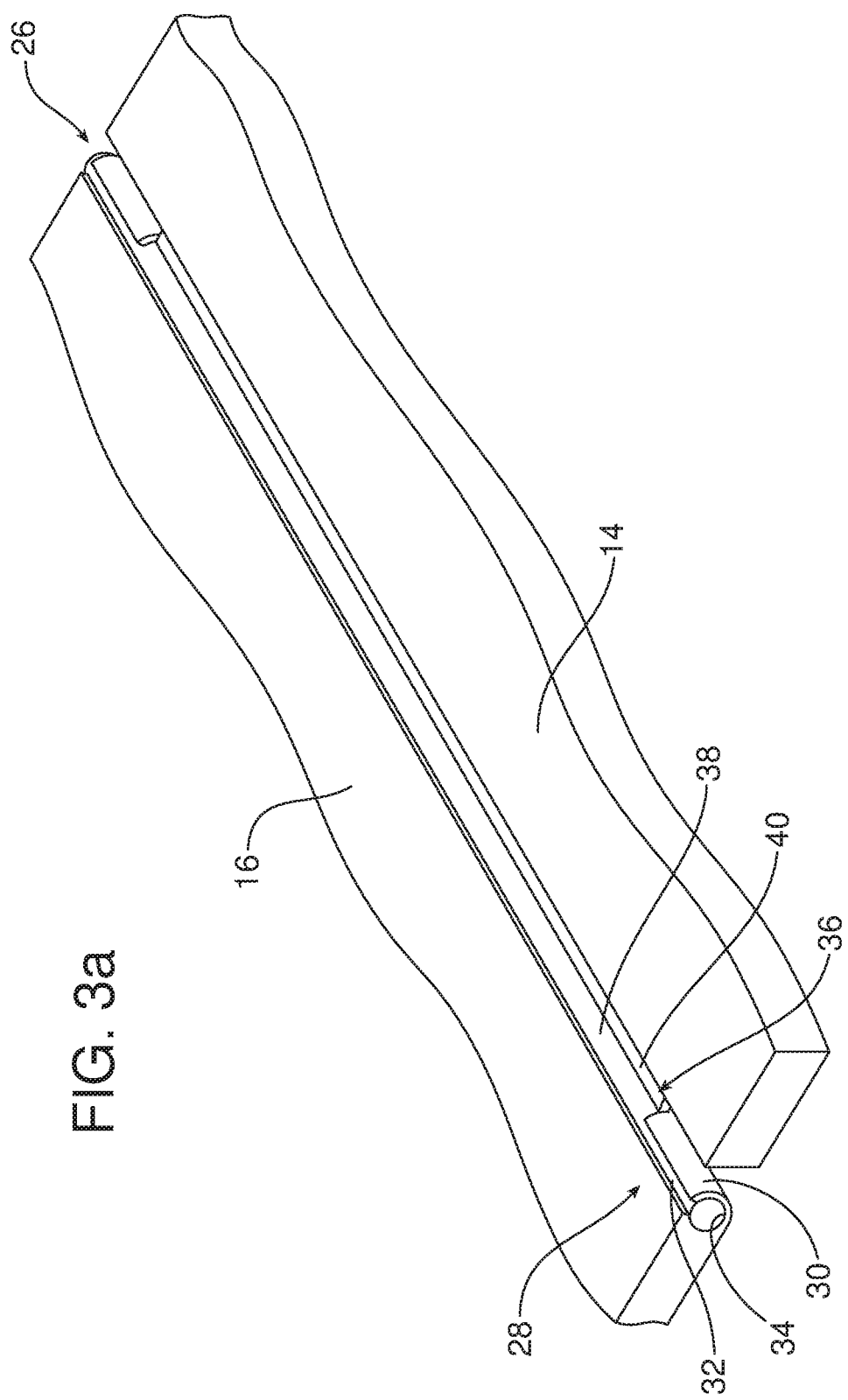
FIG. 3a is a detailed end elevational view illustrating a hinge assembly of one possible embodiment of the tonneau cover showing two panels of the tonneau cover connected by the hinge assembly in the closed, tonneau cover position.
Figure 3B:
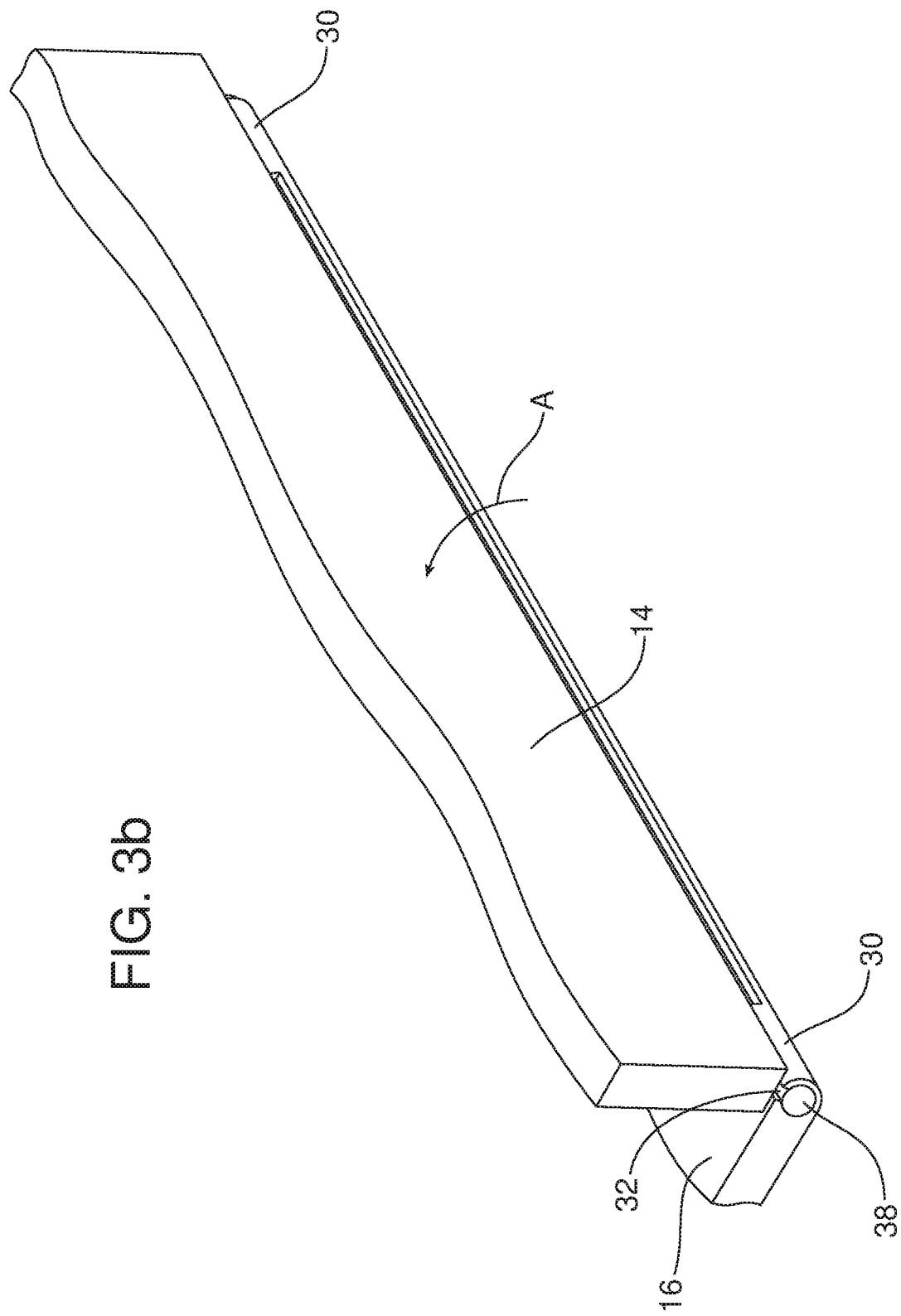
FIG. 3b is a view similar to FIG. 3a but illustrating one of the panels of the tonneau cover in the fully opened position wherein the lug of the hinge assembly is aligned with the slotted wall of the hinge assembly so as to allow the panels to slide apart.

As illustrated in FIG. 3a, when the tonneau cover 10 is configured in a horizontal position to close and fully cover the load bed of the pickup truck 12, the cylindrical body 38 is concentrically received within the slotted wall 30 and held in the cylindrical bore 34. As illustrated in FIG. 3b, the slotted wall 30 is configured to allow the first panel 14 and the second panel 16 to be hinged with respect to each other. Thus, for example, the panel 14 may be raised in the direction of action arrow A to allow access to the underlying load bed if desired.

It should be further appreciated that the second panel 16 may be displaced to a fully raised position wherein the lug 40 is aligned with the slot 32 in the slotted wall 30 as shown in FIG. 3b. Here it should further be appreciated that it is possible to disconnect the first panel 14 from the second panel 16 by aligning the lug 40 with the slot 32 in the slotted wall 30 and sliding the panel and second panel apart (see FIG. 3c). The separated panels 14, 16 are illustrated in FIG. 3d.

While not illustrated, it should be appreciated that the tonneau cover 10 may also include a second hinge assembly connecting the second panel 16 to the third panel 18. The second hinge assembly is identical to the first hinge assembly 26 illustrated in FIGS. 3a-3d except for the fact that the first section 28 may be connected to the second panel 16 while the second section 36 is connected to the third panel 18.

Reference is now made to FIGS. 4a and 4b illustrating an alternative embodiment of the tonneau cover 10 that does not include the hinge assembly 26 illustrated in FIGS. 3a-3d. In this embodiment, the tonneau cover 10 includes a first support bar 42, a second support bar 44, a third support bar 46 and a fourth support bar 48. As illustrated, the first support bar 42 includes a single panel support shoulder 50. The fourth support bar 48 also includes a single panel support shoulder 52. In contrast, the second support bar 44 includes two opposed panel support shoulders 54, 56. Similarly, the third support bar 46 includes two opposed panel support shoulders 58, 60.

As illustrated in FIG. 4b, when the tonneau cover 10 is configured in cover mode, the first panel 14 spans and is supported between the first support bar 42 and the second support bar 44 on the shoulders 50 and 54. The second panel 16 spans and is supported between the second support bar 44 and the third support bar 46 on the support bar shoulders 56 and 58. The third panel 18 spans and is supported between the third support bar 46 and the fourth support bar 48 on the panel support shoulders 52 and 60. A detent or other latch mechanism is schematically illustrated at 62. That latch mechanism 62 secures the first panel 14 to the first and second support bars 42, 44, the second panel 16 to the second and third support bars 44, 46 and the third panel 18 to the third and fourth support bars 46, 48. It should be appreciated that any one or all of the panels 14, 16, 18 may be removed from the support bars 42, 44, 46, 48 by unlatching the latch mechanism 62.

Reference is now made to FIG. 5 illustrating yet another possible embodiment of tonneau cover 10 including a first support rail 64, including a first channel 66, and a second support rail 68 including a second channel 70. As illustrated, the opposing ends of the panels 14, 16, 18 are inserted into the opposed channels 66, 70 so that the panels span the first rail support rail 64 and the second support rail 68 and cover the load bed 11 of the pickup truck 12.

Figure 6A:
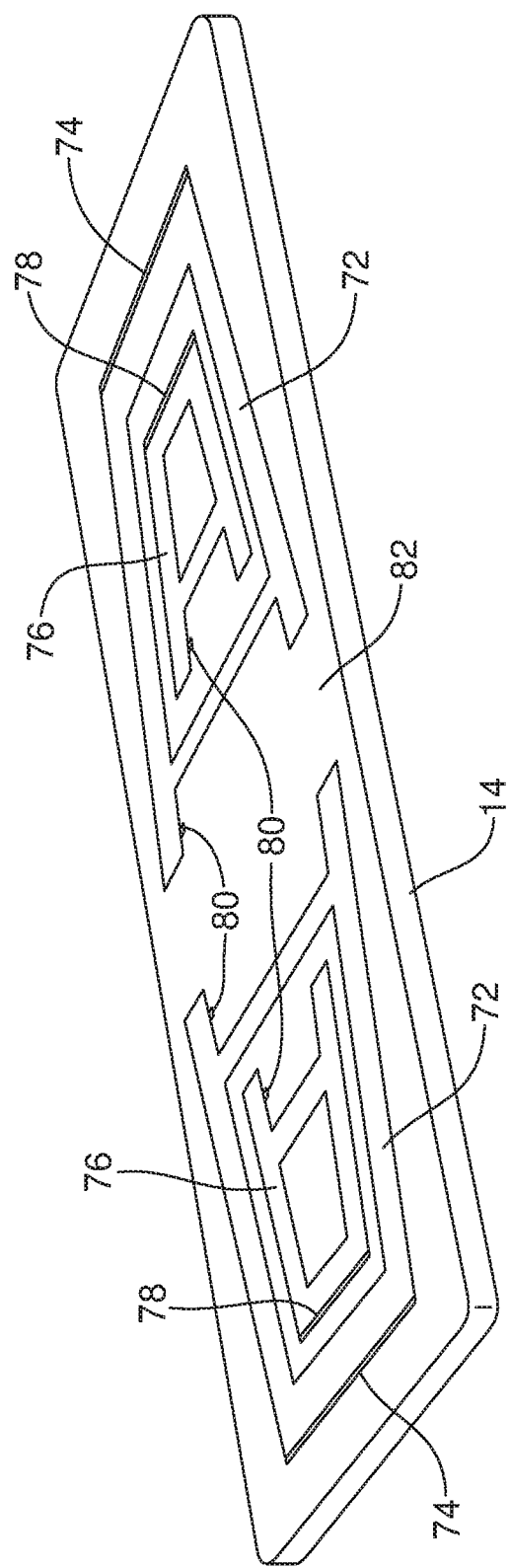
FIG. 6a is a bottom perspective view of one panel of the tonneau cover illustrating the two sets of folding legs in the stowed position.

Reference is now made to FIG. 6a which illustrates the bottom face of the first panel 14. As shown, a first set of folding legs 72 are carried on the first panel 14 by means of a first set of pivot hinges 74. As should be further appreciated, a second set of folding legs 76 are also carried on the first panel 14 by means of a second set of pivot hinges 78. As illustrated, the first set of folding legs 72 have a first length $L_1$ while the second set of folding legs 76 have a second length $L_2$. In the illustrated embodiment, $L_1 > L_2$.

Figure 6B:
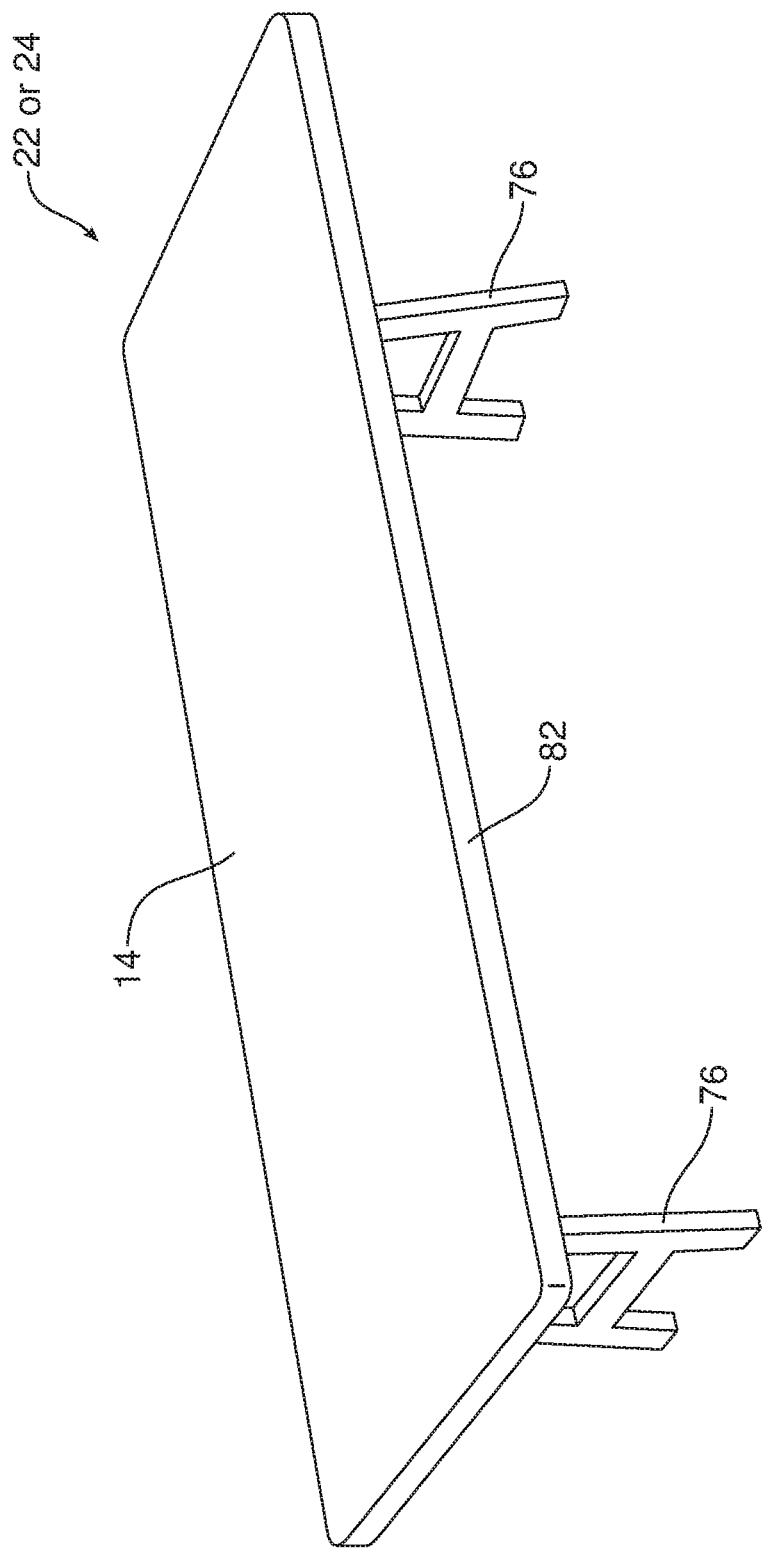
FIG. 6b is a view similar to FIG. 6a but illustrating the shorter set of legs deployed to form a bench.
Figure 6C:
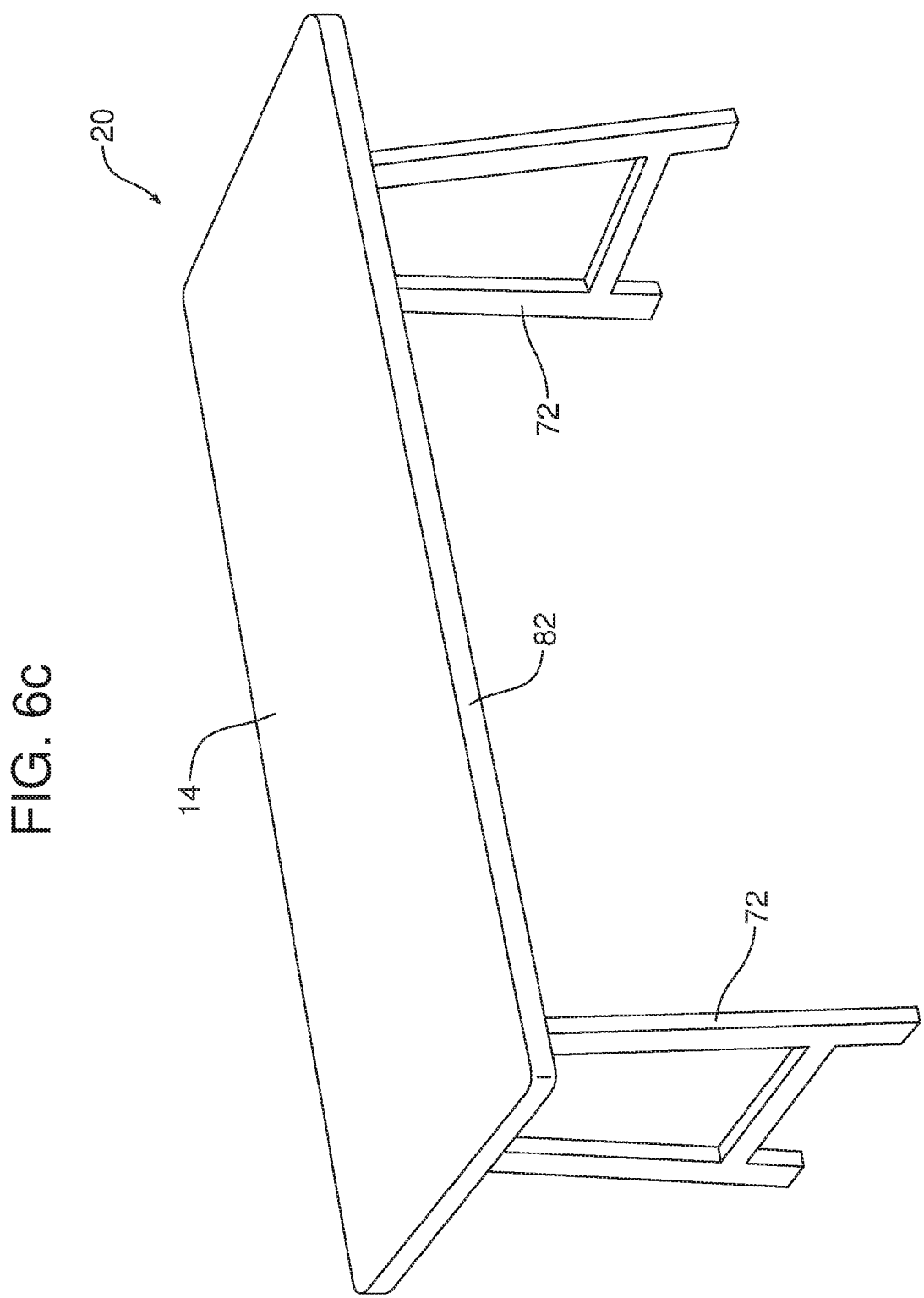
FIG. 6c is a view similar to FIG. 6b but illustrating the longer set of legs deployed to form a table.

When the tonneau cover 10 is configured in cover mode, the first and second set of folding legs 64, 66 are maintained in a stowed position flat against the first panel 14 by means of a locking mechanism schematically illustrated at 80. That locking mechanism 80 may comprise a plurality of snap clips, spring loaded detents, latching pins or other means appropriate for this purpose. In contrast, when the first panel 14 has been separated from the other panels 16, 18. the first or second set of folding legs 72, 76 may be deployed so as to extend or project from the body 82 of the first panel 14. When the first set of folding legs 72 are deployed, the panel 14 may be utilized as a work table 20 or tall sawhorse (see FIG. 6b). In contrast, when the second set of folding legs 76 are deployed, the panel 14 may be utilized as a bench 22, 24 for sitting at the table 20 or for other purposes (see FIG. 6a).

Figure 7:
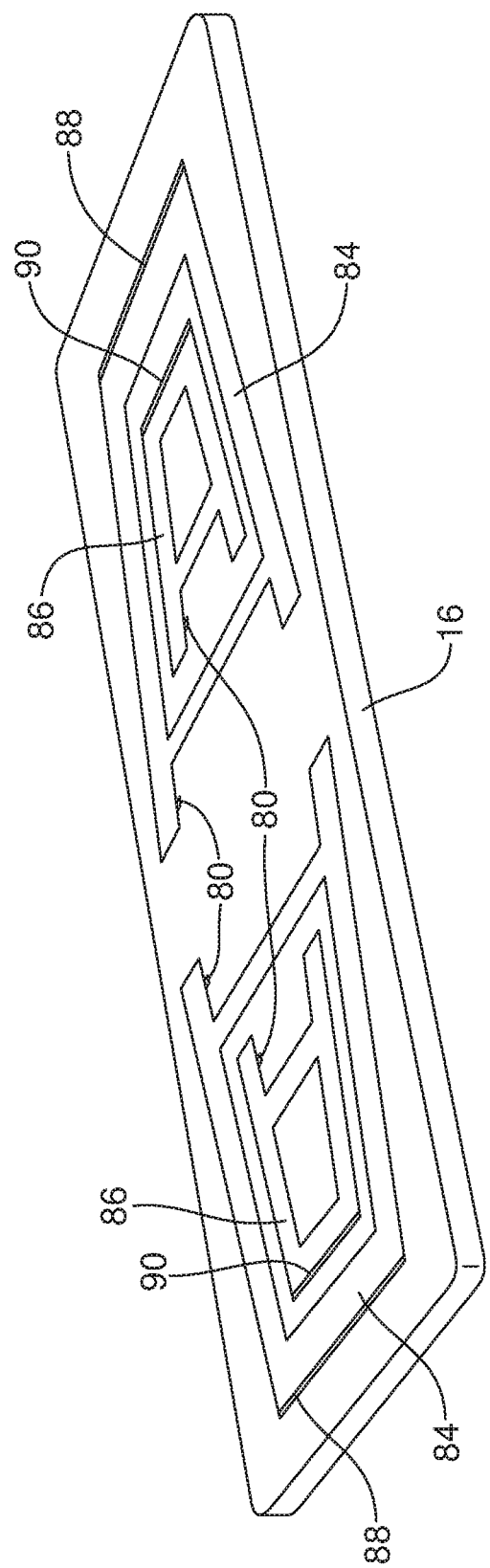
FIG. 7 is a perspective view of the second panel with the folding legs in the stowed position.

As should be appreciated from viewing FIG. 7, the second panel 16 includes a third set of folding legs 84 and a fourth set of folding legs 86 carried on the panel by respective hinges 88, 90. The third set of folding legs 84 have a length $L_3$ and the fourth set of folding legs 86 have a length L where $L_3>L_4$. In one particularly useful embodiment the length $L_3=L_1$ of the first set of folding legs 72 while the length $L_4 =L_2$ of the second set of folding legs 76. Depending on which set of legs 84 or 86 that is deployed, the second panel 16 may be utilized as a table 20 or bench 22, 24.

Figure 8:
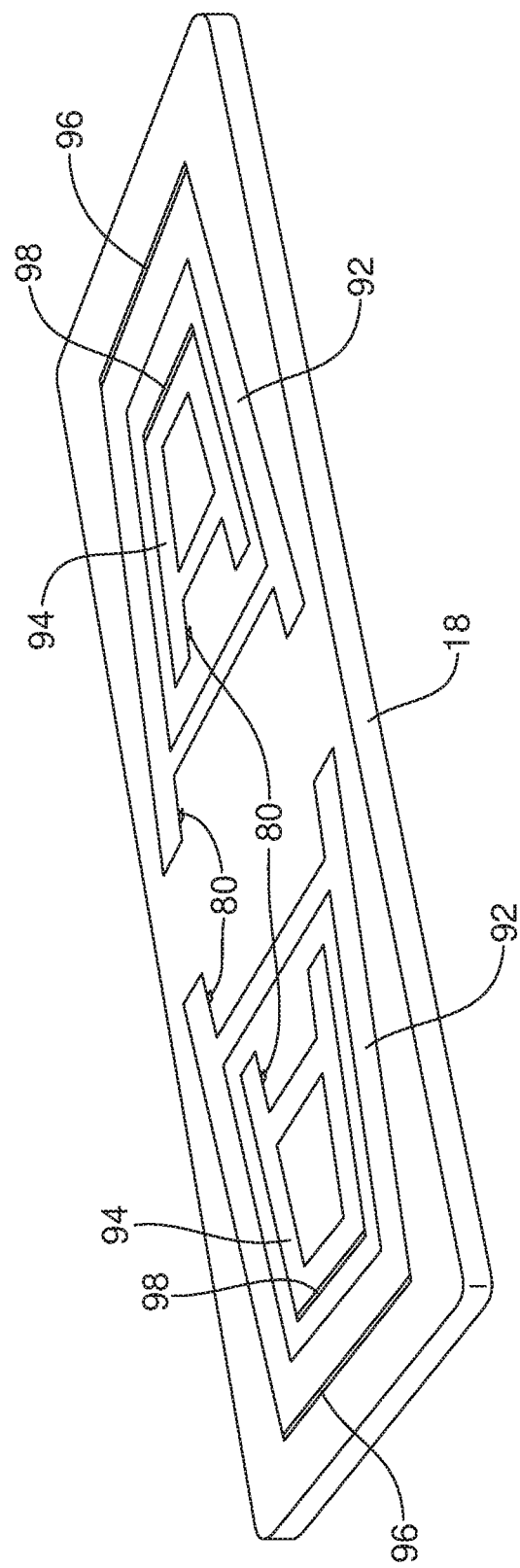
FIG. 8 is a perspective view of the third panel with the folding legs in the stowed position.

As illustrated in FIG. 8, the third panel 18 includes a fifth set of folding legs 92 and a sixth set of folding legs 94 connected to the panel by means of hinges 96, 98. The fifth set of folding legs 92 have a length $L_5$ while the sixth set of folding legs 94 have a length $L_6$ where $L_5>L_6$. In one particularly useful embodiment the length $L_5$ of the fifth set of folding legs 92 equals the length $L_3$ of the third set of folding legs 84 and the length $L_1$ of the first set of folding legs 72 while the length $L_6$ of the sixth set of folding legs 94 equals the length $L_4$ of the fourth set of folding legs 86 and the length $L_2$ of the second set of folding legs 76. As should be appreciated, depending upon the set of folding legs 72, 76, 84, 86, 92, 94 that are deployed, the three panels 14, 16, 18 may be converted into any of the following combinations: three tables/tall sawhorses 20. three benches/short sawhorses 22, 24, two tables/tall sawhorses 20 and one bench/small sawhorse 22, 24. and one table/tall sawhorse 20 and two benches/short sawhorses 22, 24. Thus, it should be appreciated that the tonneau cover 10 provides great versatility to meet the needs of the user whether those needs be on the job site or for recreational activity.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A tonneau cover, comprising:
a first panel;
a first set of folding legs carried on said first panel;
a second set of folding legs carried on said first panel wherein first set of folding legs have a first length L and said second set of folding legs have a second length $L_2$ where $L_1>L_2$;
a second panel, wherein said second panel includes a third set of folding legs having a length $L_3$ and a fourth set of folding legs having a length $L_4$ where $L_3>L_4$, and wherein $L_3=L_1$ and $L_4=L_2$;
a third panel, wherein said third panel includes a fifth set of folding legs having a length $L_5$ and a sixth set of folding legs having a length $L_6$ where $L_5>L_6$, and wherein $L_5=L_3=L_1$ and $L_6=L_4=L_2$; and
a first hinge assembly connecting said panel to said second panel and a second hinge assembly connecting said second panel to said third panel, wherein said first hinge assembly includes (a) a first section comprising a slotted wall defining a cylindrical bore and (b) a second section comprising a cylindrical body carried on a lug.

2. The tonneau cover of claim 1, wherein said cylindrical body is concentrically received within said slotted wall and held in said cylindrical bore.

3. The tonneau cover of claim 2, wherein said first panel is disconnected from said second panel by aligning said lug with a slot in said slotted wall and sliding said first panel and said second panel apart.

4. The tonneau cover of claim 1, further including a first support bar, a second support bar, a third support bar and a fourth support bar.

5. The tonneau cover of claim 4, wherein said first panel spans and is supported between said first support bar and said second support bar.

6. The tonneau cover of claim 5, wherein said second panel spans and is supported between said second support bar and said third support bar.

7. The tonneau cover of claim 6, wherein said third panel spans and is supported between said third support bar and said fourth support bar.

8. The tonneau cover of claim 7, wherein said first support bar and said fourth support bar each include a single panel support shoulder and said second support bar and said third support bar each include two panel support shoulders.

9. The tonneau cover of claim 8, further including a latch mechanism securing (a) said first panel to said first support bar and said second support bar, (b) said second panel to said second support bar and said third support bar and (c) said third panel to said third support bar and said fourth support bar.

10. The tonneau cover of claim 1, further including a first support rail and a second support rail and wherein said first panel, said second panel and said third panel span said first support rail and said second support rail.

11. The tonneau cover of claim 1, further including a locking mechanism to receive each of said first set of legs and said second set of legs in a stowed position or a deployed position.

* * * * *